(12) United States Patent
Johnson

(10) Patent No.: US 11,322,009 B1
(45) Date of Patent: May 3, 2022

(54) VEHICLE OCCUPANT ALARM ASSEMBLY

(71) Applicant: Jovani Johnson, Richmond, VA (US)

(72) Inventor: Jovani Johnson, Richmond, VA (US)

(*) Notice: Subject to any disclaimer, the term of this patent is extended or adjusted under 35 U.S.C. 154(b) by 0 days.

(21) Appl. No.: 17/124,564

(22) Filed: Dec. 17, 2020

(51) Int. Cl.
G08B 21/02 (2006.01)
B60R 21/015 (2006.01)
G08B 21/24 (2006.01)

(52) U.S. Cl.
CPC .... *G08B 21/0294* (2013.01); *B60R 21/01556* (2014.10); *G08B 21/028* (2013.01); *G08B 21/0247* (2013.01); *G08B 21/0258* (2013.01); *G08B 21/0269* (2013.01); *G08B 21/24* (2013.01)

(58) Field of Classification Search
CPC ............ G08B 21/0294; G08B 21/0247; G08B 21/0258; G08B 21/0269; G08B 21/028; G08B 21/24; B60R 21/01556
USPC ...................................... 340/573.1
See application file for complete search history.

(56) References Cited

U.S. PATENT DOCUMENTS

| | | | |
|---|---|---|---|
| 6,922,147 B1* | 7/2005 | Viksnins | B60N 2/002 340/573.1 |
| D692,784 S | 11/2013 | Anderssen | |
| 9,508,241 B2 | 11/2016 | DePascale | |
| 9,536,408 B2* | 1/2017 | Pinder | G08B 21/0202 |
| 9,712,953 B2* | 7/2017 | Singh | H04W 4/80 |
| 10,239,448 B1 | 3/2019 | Samuel, Jr. | |
| 10,424,178 B2 | 9/2019 | Thalhofer | |
| 10,467,877 B1* | 11/2019 | Elyakim | G08B 21/22 |
| 11,065,984 B2* | 7/2021 | Sherf | B60N 2/002 |
| 2003/0098792 A1* | 5/2003 | Edwards | G08B 13/1427 340/573.1 |
| 2010/0267361 A1 | 10/2010 | Sullivan | |
| 2010/0274104 A1 | 10/2010 | Khan | |
| 2012/0232749 A1* | 9/2012 | Schoenberg | B60N 2/28 701/36 |
| 2013/0109342 A1* | 5/2013 | Welch | G08B 21/22 455/404.2 |
| 2015/0130604 A1* | 5/2015 | Gomez Collazo | G08B 21/22 340/457 |
| 2015/0137962 A1* | 5/2015 | Binnicker | B60N 2/002 340/457 |
| 2015/0274036 A1* | 10/2015 | Arad | B60N 2/002 340/573.1 |
| 2018/0111506 A1 | 4/2018 | Penna | |
| 2019/0027011 A1 | 1/2019 | Gordon | |
| 2019/0272729 A1* | 9/2019 | Staninger | G08B 21/24 |

* cited by examiner

*Primary Examiner* — Albert K Wong (57) ABSTRACT

A vehicle occupant alarm assembly includes a remote unit that is carried by a caregiver driving a vehicle. The remote unit broadcasts a location signal. A base unit is attachable to a child that is seated in a vehicle and the base unit is in remote communication with an extrinsic communication network. The base unit receives the location signal and the base unit transmits an alert signal to the extrinsic communication network when the location signal falls below a pre-determined signal strength. The remote unit receives an alert from the extrinsic communication network when the base unit transmits the alert signal to the extrinsic communication network. In this way the remote unit alerts the caregiver that the child may be unattended in the vehicle.

10 Claims, 5 Drawing Sheets

VEHICLE OCCUPANT ALARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to occupant alarm devices and more particularly pertains to a new occupant alarm device for alerting a caregiver when a child is left unoccupied in a vehicle.

(2) Description of Related Art Including Information Disclosed Under 37 CFR 1.97 and 1.98

The prior art relates to occupant alarm devices including a wearable tracking device that is in communication with an administrative input terminal. The prior art discloses a various occupant alarms that detect the interior temperature of a vehicle and sends an alert signal to a caregiver when the temperature exceeds a predetermined temperature. The prior art discloses an occupant alarm that is wearable on a wrist of a child and that has a cellular phone integrated therein that can track the location of the child. The prior art further discloses a variety of occupant alarms that include a plurality of vital sign sensors for monitoring vital signs of a child in a vehicle and that transmits an alarm signal when any measured vital sign is out of normal parameters.

BRIEF SUMMARY OF THE INVENTION

An embodiment of the disclosure meets the needs presented above by generally comprising a remote unit that is carried by a caregiver driving a vehicle. The remote unit broadcasts a location signal. A base unit is attachable to a child that is seated in a vehicle and the base unit is in remote communication with an extrinsic communication network. The base unit receives the location signal and the base unit transmits an alert signal to the extrinsic communication network when the location signal falls below a pre-determined signal strength. The remote unit receives an alert from the extrinsic communication network when the base unit transmits the alert signal to the extrinsic communication network. In this way the remote unit alerts the caregiver that the child may be unattended in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 5 thereof, a new occupant alarm device embodying the principles and concepts of an embodiment of the disclosure and generally designated by the reference numeral 10 will be described.

As best illustrated in FIGS. 1 through 5, the vehicle occupant alarm assembly 10 generally comprises a remote unit 12 is carried by a caregiver driving a vehicle. The vehicle may be a passenger vehicle, a cargo vehicle or any other motorized vehicle that is driven on public roadways. The remote unit 12 broadcasts a location signal and the remote unit 12 is in remote communication with an extrinsic communication network 14. The extrinsic communication network 14 may be a cellular phone network, the internet or any other type of wireless communication network. Moreover, the remote unit 12 can communicate with a third party security provider, such as ADT®, OnStar® or other similar type of vehicle emergency assistance provider.

Figure 3:
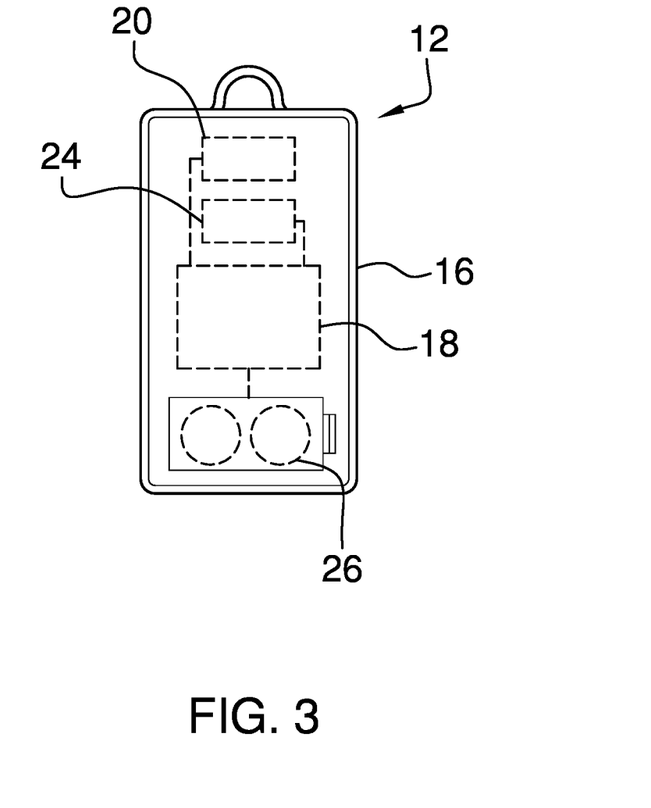
FIG. 3 is a back phantom view of a remote unit of an embodiment of the disclosure.

The remote unit 12 comprises a fob 16 that is attachable to keys for the vehicle. A remote control circuit 18 is integrated into the fob 16 and the remote control circuit 18 receives an alert input. A remote transceiver 20 is integrated into the fob 16 and the remote transceiver 20 is electrically coupled to the remote control circuit 18. The remote transceiver 20 broadcasts the location signal and the remote transceiver 20 is in wireless communication with the extrinsic communication network 14. Additionally, the remote control circuit 18 receives the alert input when the remote transceiver 20 receives an alert signal from the extrinsic communication network 14, and the alert signal includes an alpha numeric code. The remote transceiver 20 may be a radio frequency transceiver or the like and the remote transceiver 20 may employ Bluetooth communication protocols. Additionally, the remote transceiver 20 may be a multiple channel transceiver thereby facilitating the remote transceiver 20 to communicate with more than one signal source.

A remote display 22 is coupled to the fob 16 such that the remote display 22 is visible to the caregiver and the remote display 22 is electrically coupled to the remote control circuit 18. The remote display 22 displays indicia comprising the alpha numeric code received from the extrinsic communication network 14. The remote display 22 may comprise an LED or other type of electronic display. A speaker 24 is coupled to the fob 16 to emit audible sounds outwardly therefrom and the speaker 24 is electrically coupled to the remote control circuit 18. The speaker 24 emits an audible alert when the remote control circuit 18 receives the alert input to audibly alert the caregiver. A remote power supply 26 is removably integrated into the fob 16, the remote power supply 26 is electrically coupled to the remote control circuit 18 and the remote power supply 26 comprises at least one battery.

Figure 1:
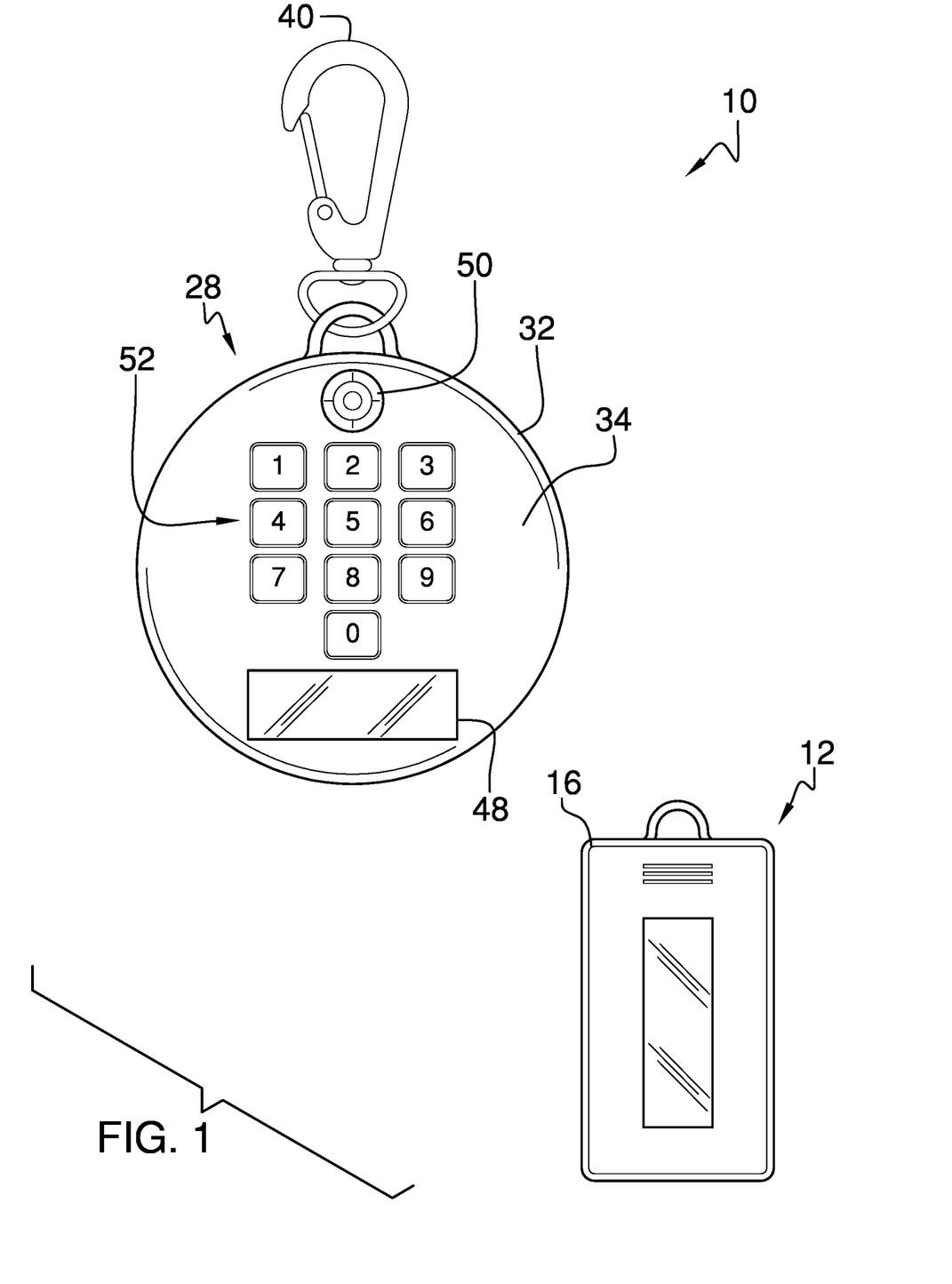
FIG. 1 is a perspective view of a vehicle occupant alarm assembly according to an embodiment of the disclosure.
Figure 2:
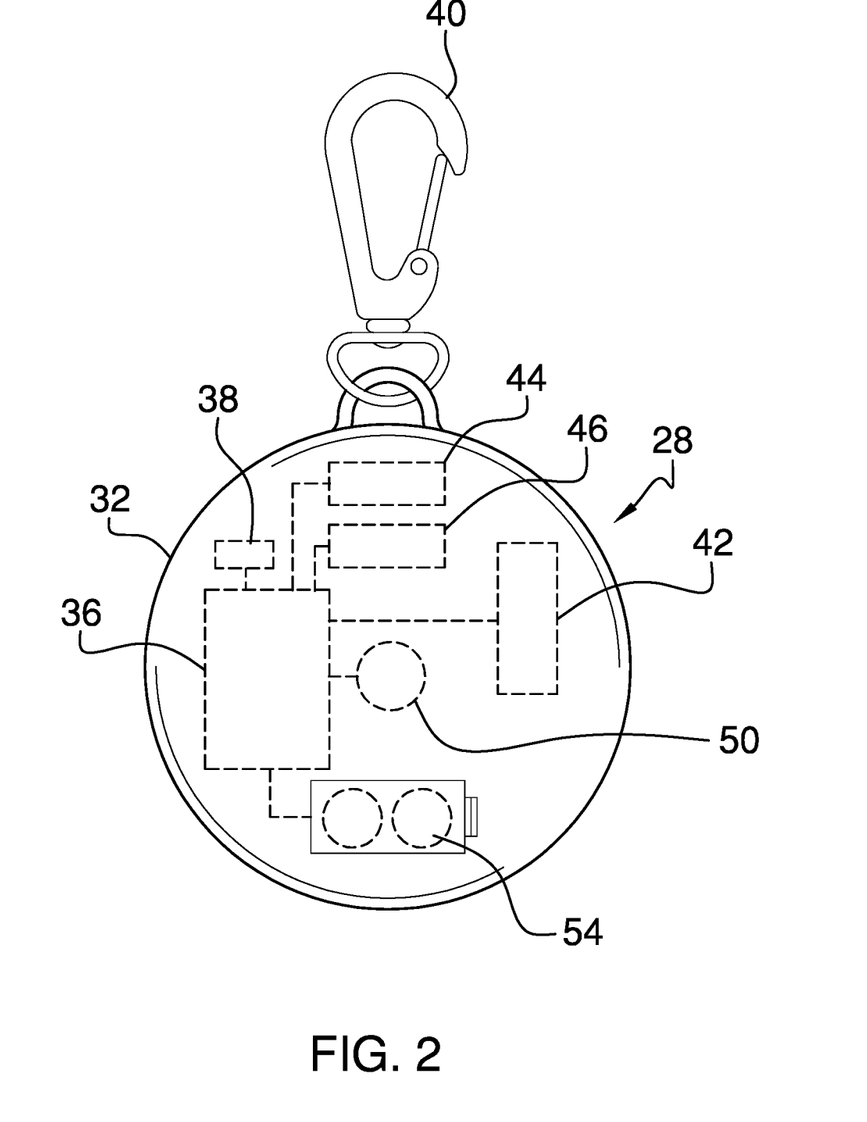
FIG. 2 is a back phantom view of a base unit of an embodiment of the disclosure.

A base unit 28 is attachable to a child 30 that is seated in a vehicle and the base unit 28 has an alpha-numeric code assigned thereto. The alpha numeric code is registered with the third part security provider when the base unit 28 is purchased. The base unit 28 is in remote communication with the extrinsic communication network 14 and the base unit 28 receives the location signal. Moreover, the base unit 28 transmits an alert signal to the extrinsic communication network 14 when the location signal falls below a pre-determined signal strength. The remote unit 12 receives an alert from the extrinsic communication network 14 when the base unit 28 transmits the alert signal to the extrinsic communication network 14. In this way the remote unit 12 alerts the caregiver that the child 30 may be unattended in the vehicle.

The base unit 28 comprises a housing 32 that has a front wall 34 and a base control circuit 36 that is integrated into the housing 32. The base control circuit 36 receives a distance input, an alarm input, a temperature input and a stand down input. An electronic timer 38 is integrated into the housing 32 and the electronic timer 38 is electrically coupled to the base control circuit 36. The electronic timer 38 begins a countdown when the control circuit receives the distance input. Moreover, the control circuit receives the alarm input when the electronic timer 38 counts-down a pre-determined duration of time. The pre-determined duration of time may range between approximately 5.0 minutes and 10.0 minutes. A clasp 40 is movably coupled to the housing 32 that can releasably engage the child 30's clothing, a belt on a car seat or any other supporting object.

Figure 5:
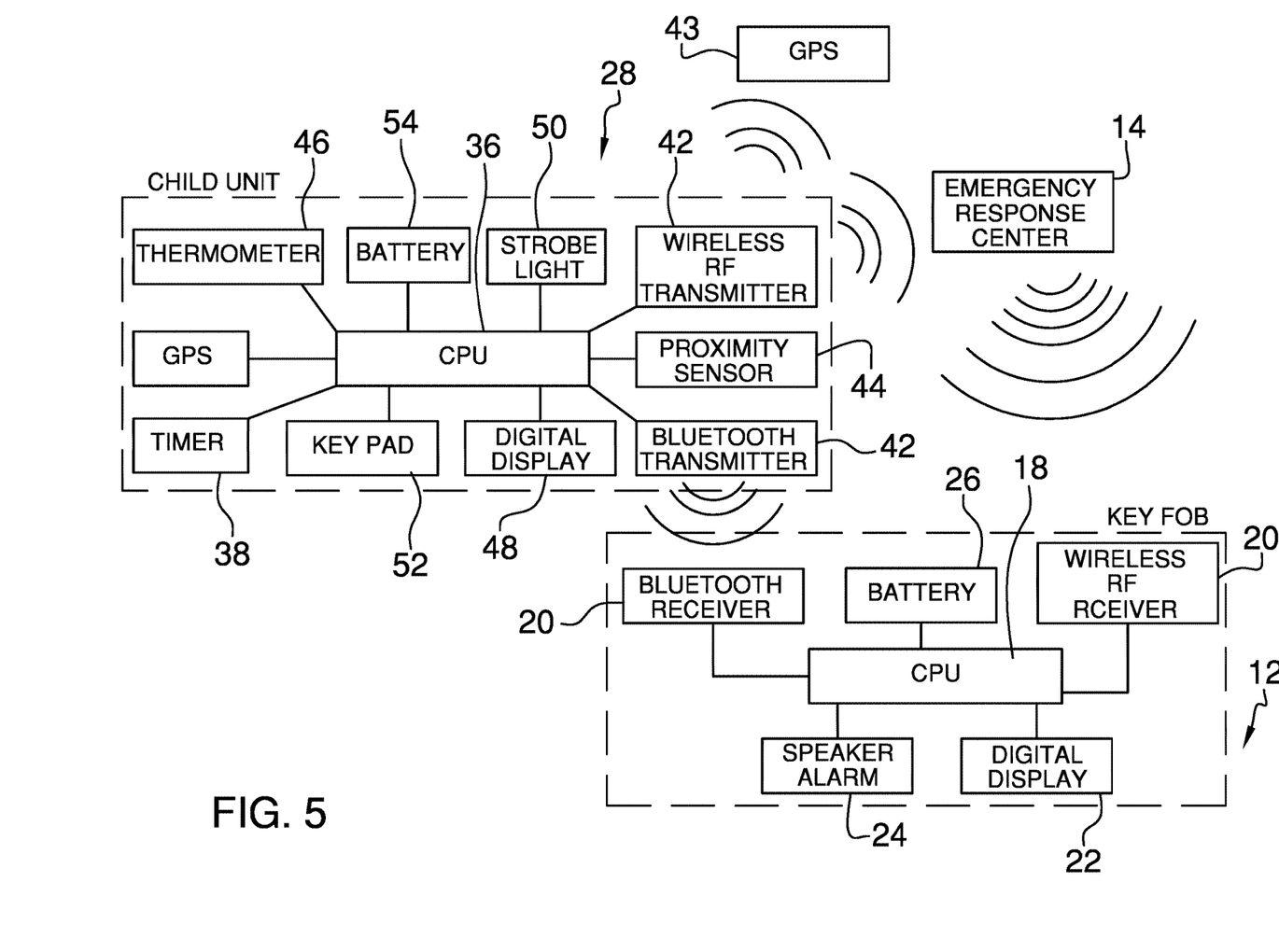
FIG. 5 is a schematic view of an embodiment of the disclosure.

A base transceiver 42 is integrated into the housing 32 and the base transceiver 42 is electrically coupled to the base control circuit 36. The base transceiver 42 is in wireless communication with the extrinsic communication network 14 to communicate with the third party security provider. The base transceiver 42 receives the location signal from the remote transceiver 20. Additionally, the base transceiver 42 is in wireless communication with a global positioning system (gps) 43 to determine the physical location of the housing 32. The base transceiver 42 may comprise a radio frequency transceiver or the like and the base transceiver 42 may employ Bluetooth communication protocols. Additionally, the base transceiver 42 may be a multiple channel transceiver thereby facilitating the base transceiver 42 to communicate with more than one signal source.

A signal analyzer 44 provided and the signal analyzer 44 is integrated into the housing 32. The signal analyzer 44 is electrically coupled to the base control circuit 36 and the signal analyzer 44 determines the signal strength of the location signal.

Additionally, the base control circuit 36 receives the distance input when the signal analyzer 44 determines the signal strength of the location signal drops below a pre-determined signal strength. The base transceiver 42 broadcasts an alert signal to the extrinsic communication network 14 for alerting the third party security provider to contact the caregiver for verification that the child 30 has not been left unattended in the vehicle.

A thermometer 46 is integrated into the housing 32 and the thermometer 46 is in thermal communication with ambient air. The thermometer 46 is electrically coupled to the base control circuit 36 and the base control circuit 36 receives the temperature input when the thermometer 46 measures a temperature that exceeds a pre-determined maximum temperature. The pre-determined maximum temperature may be approximately 80.0 degrees Fahrenheit. The base transceiver 42 broadcasts the alert signal to the extrinsic communication network 14 when the base control circuit 36 receives the temperature input. In this way the third party security provider is alerted to contact the caregiver to verify that the child 30 has not been left unattended in the vehicle.

A base display 48 is coupled to the front wall 34 of the housing 32 such that the base display 48 is visible to the caregiver. The base display 48 is electrically coupled to the base control circuit 36 and the base display 48 displays indicia comprising words and letters communicating operational parameters of the base control circuit 36. The base display 48 may comprise an LED or other electronic display. A strobe light 50 is coupled to the housing 32 to emit a visual alert and the strobe light 50 is electrically coupled to the base control circuit 36. The strobe light 50 is turned on when the base control circuit 36 receives the alarm input and the strobe light 50 is turned off when the base control circuit 36 receives the stand down input.

A keypad 52 is coupled to the housing 32 such that the keypad 52 is accessible to the caregiver and the keypad 52 is electrically coupled to the base control circuit 36. The keypad 52 is manipulated to enter the alpha numeric code displayed on the remote display 22. Additionally, the base control circuit 36 receives the stand down input when the alpha numeric code is entered with the keypad 52. The keypad 52 may comprise a ten key number pad or other similar type of keypad 52. The base unit 28 includes a base power supply 54 that is removably integrated into the housing 32, the base power supply 54 is electrically coupled to the base control circuit 36 and the base power supply 54 comprises at least one battery.

Figure 4:
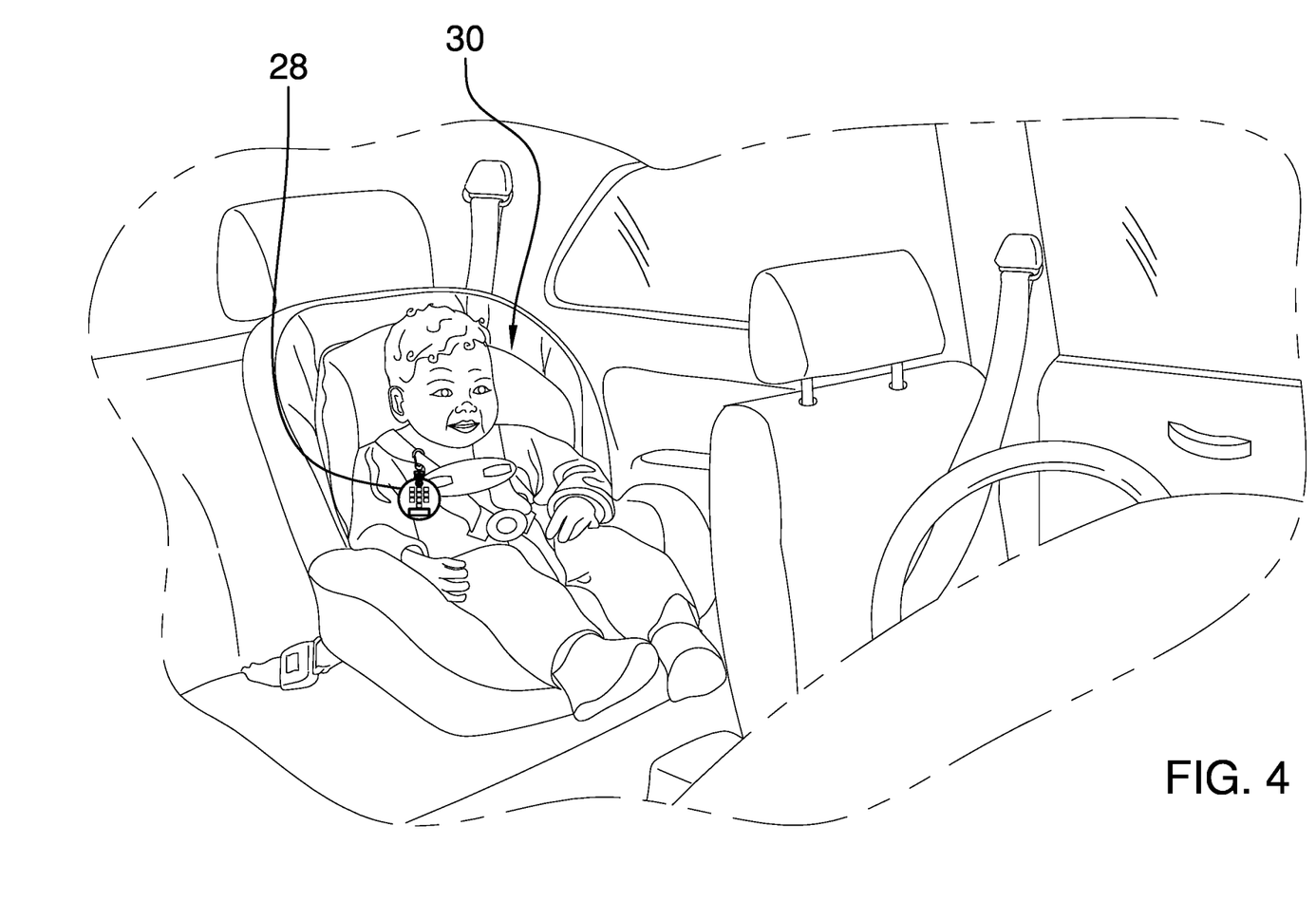
FIG. 4 is a perspective in-use view of an embodiment of the disclosure.

In use, the base unit 28 continuously receives the location signal from the remote unit 12 to facilitate the base unit 28 to determine the distance between the remote unit 12 and the base unit 28. The electronic timer 38 begins the countdown when the remote unit 12 moves beyond the trigger distance from the base unit 28. The base transceiver 42 contacts the third party emergency security service when the electronic timer 38 counts down the pre-determined contacts the third party security provider when the base unit 28 determines that the remote unit 12 has moved a trigger distance beyond the child 30 for the pre-determined duration of time. The third party security provider contacts the caregiver to alert the caregiver that the child 30 may be unattended in the vehicle. Moreover, the third party security provider contacts emergency responders when the caregiver does not enter the alpha-numeric code into the base unit 28 within a pre-determined amount of time. In this way the emergency responders can receive the gps location of the vehicle and respond to the potential threat to the child's life.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle occupant alarm assembly for alerting a caregiver that a child has been left unoccupied in a vehicle, said assembly comprising:
   a remote unit being carried by a caregiver driving a vehicle, said remote unit broadcasting a location signal, said remote unit being in remote communication with an extrinsic communication network wherein said remote unit is configured to communicate with a third party security provider;
   a base unit being attachable to a child that is seated in a vehicle, said base unit having an alpha-numeric code being assigned thereto, said base unit being in remote communication with an extrinsic communication network wherein said base unit is configured to be in communication with a third party security provider, said base unit receiving said location signal, said base unit transmitting an alert signal to the extrinsic communication network when said location signal falls below a pre-determined signal strength, said remote unit receiving an alert from the extrinsic communication network when said base unit transmits said alert signal to the extrinsic communication network wherein said remote unit is configured to alert the caregiver that the child may be unattended in the vehicle;
   wherein base unit comprises:
      a housing having a front wall;
      a base control circuit being integrated into said housing, said base control circuit receiving a distance input, said base control circuit receiving an alarm input, said base control circuit receiving a temperature input, said base control circuit receiving a stand down input; and
      an electronic timer being integrated into said housing, said electronic timer being electrically coupled to said base control circuit, said electronic timer beginning a countdown when said control circuit receives said distance input, said control circuit receiving said alarm input when said electronic timer counts-down a pre-determined duration of time;
   wherein said remote unit includes a remote transceiver, said remote transceiver broadcasting a location signal; and
   wherein said base unit includes a base transceiver being integrated into said housing, said base transceiver being electrically coupled to said base control circuit, said base transceiver being in wireless communication with the extrinsic communication network wherein said base transceiver is configured to communicate with a third party security provider, said base transceiver receiving said location signal from said remote transceiver, said base transceiver being in wireless communication with a global positioning system (gps) wherein said base transceiver is configured to determine the physical location of said housing; and
   wherein said base unit includes a keypad being coupled to said housing such that said keypad is accessible to the caregiver, said keypad being electrically coupled to said base control circuit, said keypad being manipulated to enter the alpha numeric code displayed on said remote display, said base control circuit receiving said stand down input when the alpha numeric code is entered with said keypad.

2. The assembly according to claim 1, wherein said remote unit comprises:
   a fob being attachable to keys for the vehicle;
   a remote control circuit being integrated into said fob, said remote control circuit receiving an alert input; and
   a remote transceiver being integrated into said fob, said remote transceiver being electrically coupled to said remote control circuit, said remote transceiver broadcasting said location signal, said remote transceiver being in wireless communication with the extrinsic communication network, said remote control circuit receiving said alert input when said remote transceiver receives an alert signal from the extrinsic communication network, said alert signal including an alpha numeric code.

3. The assembly according to claim 2, wherein said remote unit includes a remote display being coupled to said fob such that said remote display is visible to the caregiver, said remote display being electrically coupled to said remote control circuit, said remote display displaying indicia comprising the alpha numeric code received from the extrinsic communication network.

4. The assembly according to claim 2, wherein said remote unit includes a speaker being coupled to said fob wherein said speaker is configured to emit audible sounds outwardly therefrom, said speaker being electrically coupled to said remote control circuit, said speaker emitting an audible alert when said remote control circuit receives said alert input wherein said speaker is configured to audibly alert the caregiver.

5. The assembly according to claim 2, wherein said remote unit includes a remote power supply being removably integrated into said fob, said remote power supply being electrically coupled to said remote control circuit, said remote power supply comprising at least one battery.

6. The assembly according to claim 1, wherein said base unit includes a signal analyzer being integrated into said housing, said signal analyzer being electrically coupled to said base control circuit, said signal analyzer determining a signal strength of said location signal, said base control circuit receiving said distance input when said signal analyzer determines the signal strength of said location signal drops below a pre-determined signal strength, said base transceiver broadcasting an alert signal to the extrinsic communication network when said wherein said base transceiver is configured to alert the third party security provider to contact the caregiver for verification that the child has not been left unattended in the vehicle.

7. The assembly according to claim 1, wherein said base unit includes a thermometer being integrated into said housing wherein said thermometer is configured to be in thermal communication with ambient air, said thermometer being electrically coupled to said base control circuit, said base control circuit receiving said temperature input when said thermometer measures a temperature that exceeds a pre-determined maximum temperature, said base transceiver broadcasting said alert signal to the extrinsic communication network when said base control circuit receives said temperature input wherein said base transceiver is configured to alert the third party security provider to contact the caregiver to verify that the child has not been left unattended in the vehicle.

8. The assembly according to claim 1, wherein said base unit includes a base display being coupled to said housing such that said base display is visible to the caregiver, said base display being electrically coupled to said base control circuit, said base display displaying indicia comprising words and letters communicating operational parameters of said base control circuit.

9. The assembly according to claim 1, wherein said base unit includes a strobe light being coupled to said housing wherein said strobe light is configured to emit a visual alert, said strobe light being electrically coupled to said base control circuit, said strobe light being turned on when said base control circuit receives said alarm input, said strobe light being turned off when said base control circuit receives said stand down input.

10. A vehicle occupant alarm assembly for alerting a caregiver that a child has been left unoccupied in a vehicle, said assembly comprising:
  a remote unit being carried by a caregiver driving a vehicle, said remote unit broadcasting a location signal, said remote unit being in remote communication with an extrinsic communication network wherein said remote unit is configured to communicate with a third party security provider, said remote unit comprising:
  a fob being attachable to keys for the vehicle;
  a remote control circuit being integrated into said fob, said remote control circuit receiving an alert input;
  a remote transceiver being integrated into said fob, said remote transceiver being electrically coupled to said remote control circuit, said remote transceiver broadcasting said location signal, said remote transceiver being in wireless communication with the extrinsic communication network, said remote control circuit receiving said alert input when said remote transceiver receives an alert signal from the extrinsic communication network, said alert signal including an alpha numeric code;
  a remote display being coupled to said fob such that said remote display is visible to the caregiver, said remote display being electrically coupled to said remote control circuit, said remote display displaying indicia comprising the alpha numeric code received from the extrinsic communication network;
  a speaker being coupled to said fob wherein said speaker is configured to emit audible sounds outwardly therefrom, said speaker being electrically coupled to said remote control circuit, said speaker emitting an audible alert when said remote control circuit receives said alert input wherein said speaker is configured to audibly alert the caregiver; and
  a remote power supply being removably integrated into said fob, said remote power supply being electrically coupled to said remote control circuit, said remote power supply comprising at least one battery; and
a base unit being attachable to a child that is seated in a vehicle, said base unit having an alpha-numeric code being assigned thereto, said base unit being in remote communication with an extrinsic communication network, said base unit receiving said location signal, said base unit transmitting an alert signal to the extrinsic communication network when said location signal falls below a pre-determined signal strength, said remote unit receiving an alert from the extrinsic communication network when said base unit transmits said alert signal to the extrinsic communication network wherein said remote unit is configured to alert the caregiver that the child may be unattended in the vehicle, said base unit comprising:
  a housing having a front wall;
  a base control circuit being integrated into said housing, said base control circuit receiving a distance input, said base control circuit receiving an alarm input, said base control circuit receiving a temperature input, said base control circuit receiving a stand down input;
  an electronic timer being integrated into said housing, said electronic timer being electrically coupled to said base control circuit, said electronic timer beginning a countdown when said control circuit receives said distance input, said control circuit receiving said alarm input when said electronic timer counts-down a pre-determined duration of time;
  a base transceiver being integrated into said housing, said base transceiver being electrically coupled to said base control circuit, said base transceiver being in wireless communication with the extrinsic communication network wherein said base transceiver is configured to communicate with a third party security provider, said base transceiver receiving said location signal from said remote transceiver, said base transceiver being in wireless communication with a global positioning system (gps) wherein said base transceiver is configured to determine the physical location of said housing;
  a signal analyzer being integrated into said housing, said signal analyzer being electrically coupled to said base control circuit, said signal analyzer determining a signal strength of said location signal, said base control circuit receiving said distance input when said signal analyzer determines the signal strength of said location signal drops below a pre-determined signal strength, said base transceiver broadcasting an alert signal to the extrinsic communication network wherein said base transceiver is configured to alert the third party security provider to contact the caregiver for verification that the child has not been left unattended in the vehicle;
  a thermometer being integrated into said housing wherein said thermometer is configured to be in thermal communication with ambient air, said thermometer being electrically coupled to said base control circuit, said base control circuit receiving said temperature input when said thermometer measures a temperature that exceeds a pre-determined maximum temperature, said base transceiver broadcasting said alert signal to the extrinsic communication network when said base control circuit receives said temperature input wherein said base transceiver is configured to alert the third party security provider to contact the caregiver to verify that the child has not been left unattended in the vehicle;

a base display being coupled to said housing such that said base display is visible to the caregiver, said base display being electrically coupled to said base control circuit, said base display displaying indicia comprising words and letters communicating operational parameters of said base control circuit;

a strobe light being coupled to said housing wherein said strobe light is configured to emit a visual alert, said strobe light being electrically coupled to said base control circuit, said strobe light being turned on when said base control circuit receives said alarm input, said strobe light being turned off when said base control circuit receives said stand down input;

a keypad being coupled to said housing such that said keypad is accessible to the caregiver, said keypad being electrically coupled to said base control circuit, said keypad being manipulated to enter the alpha numeric code displayed on said remote display, said base control circuit receiving said stand down input when the alpha numeric code is entered with said keypad; and a base power supply being removably integrated into said housing, said base power supply being electrically coupled to said base control circuit, said base power supply comprising at least one battery.

\* \* \* \* \*